US010723268B2

(12) United States Patent
Sinelli et al.

(10) Patent No.: US 10,723,268 B2
(45) Date of Patent: Jul. 28, 2020

(54) REAR VIEW DEVICE WITH MULTI-PIECE BACKING PLATE

(71) Applicant: SMR Patents S.à.r.l., Luxembourg (LU)

(72) Inventors: Gary Sinelli, Birmingham, MI (US); Anthony P. D'Andrea, Attica, MI (US); Paul R. Henion, Port Huron, MI (US); Simon David Field, Flagstaff Hill (AU); Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/977,600

(22) Filed: May 11, 2018

(65) Prior Publication Data

US 2019/0344717 A1 Nov. 14, 2019

(51) Int. Cl.
*B60R 1/06* (2006.01)
*B60R 1/02* (2006.01)
*F21S 45/37* (2018.01)
*B60Q 1/26* (2006.01)
*B60R 1/12* (2006.01)
*B60R 1/04* (2006.01)

(52) U.S. Cl.
CPC .............. *B60R 1/06* (2013.01); *B60Q 1/2665* (2013.01); *B60R 1/02* (2013.01); *B60R 1/12* (2013.01); *B60R 1/1207* (2013.01); *F21S 45/37* (2018.01); *B60R 1/04* (2013.01); *B60R 2001/1253* (2013.01); *B60R 2300/20* (2013.01); *B60R 2300/8026* (2013.01)

(58) Field of Classification Search
CPC .. B60R 1/007; B60R 1/06; B60R 1/02; B60R 1/066; B60R 1/0605; B60R 1/025; B60R 1/062; B60R 1/064; B60R 1/072; B60R 1/08; B60R 1/081; B60R 1/082; B60Q 1/2665
USPC ......................................... 359/850, 871, 872
See application file for complete search history.

(56) References Cited

U.S. PATENT DOCUMENTS

2009/0040306 A1\* 2/2009 Foote ...................... B60R 1/082
348/148

\* cited by examiner

*Primary Examiner* — Ryan D Howard
(74) *Attorney, Agent, or Firm* — Jones Day (57) ABSTRACT

A rearview device for use with a vehicle includes a first reflective element backing plate, a first reflective element positioned on the first reflective element backing plate, a second reflective element backing plate, a second reflective element positioned on the second reflective element backing plate, and an attachment mechanism including at least one of one or more tracks, snaps, clips, and projections configured to attach the first reflective element backing plate to the second reflective element backing plate.

15 Claims, 7 Drawing Sheets

REAR VIEW DEVICE WITH MULTI-PIECE BACKING PLATE

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to a rear view device for a motor vehicle. For example, a rear view device for a motor vehicle includes a first and second reflective element each positioned on a first and second reflective element backing plates attached to one another.

2. Description of Related Art

Blind Spot rear view devices are well known in the art and include automotive rearview mirrors that have a main viewing reflector combined with a secondary blind spot reflector both contained on a single piece of molded plastic. Both the main reflector and the blind spot reflector move in unison when the operator adjusts his field of view with the electric actuator (or manual version) within the automotive rearview device. Typically, the backing plate of the main reflector and the backing plate of the blind spot reflector are formed as a single piece.

In addition, rear view devices, such as those including a camera pod, are typically exposed to the outside environment when used as a side view mirror secured to the outside of a vehicle and when used inside a vehicle as an internal rear view mirror. Rear view devices are typically made up of many components which require a number of different assembly parts and are complicated and expensive to manufacture. In certain applications, a conventional rear view device typically fails to provide a full and expansive field of view including a sufficiently wide angle view as may be desired by a driver for viewing the driver's blind spot.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a rearview device for use with a vehicle includes a first reflective element backing plate, a first reflective element positioned on the first reflective element backing plate, a second reflective element backing plate, a second reflective element positioned on the second reflective element backing plate, and an attachment mechanism comprising at least one of one or more tracks, snaps, clips, and projections or adhesive joint configured to attach the second reflective element backing plate to the first reflective element backing plate.

The attachment mechanism may include a pair of tracks which extend from either the first reflective element backing plate or the second reflective element backing plate, and a pair of corresponding track receiving portions which extend into the other of the first reflective element backing plate or the second reflective element backing plate.

Each of the pair of track receiving portions may include at least one lock or snap configured to lock the track into the track receiving portion.

Each of the pair of track receiving portions may include one or more protrusions configured to interact with one or more protrusion receiving portions on each of the pair of tracks.

The pair of tracks may extend in a direction which is substantially parallel with a plane on which the first reflective element extends.

The attachment mechanism may include one or more snaps which extend from either the first reflective element backing plate or the second reflective element backing plate in a direction which is perpendicular to a plane on which the first reflective element extends, and one or more snap receiving portions on the other of the first reflective element backing plate or the second reflective element backing plate.

The one or more snaps may include three snapping projections which extend from a position on the second reflective element backing plate and have at least two different shapes.

The attachment mechanism may include one or more clips which extend from either the first reflective element backing plate or the second reflective element backing plate, and one or more corresponding clip receiving portions positioned on the other of the first reflective element backing plate or the second reflective element backing plate.

The one or more clips may include at least one snap-fit clip and the one or more corresponding clip receiving portions may include at least one corresponding opening, the snap-fit clip being configured to snap into the corresponding opening.

The attachment mechanism may include one or more finger shaped projections which extend from either the first reflective element backing plate or the second reflective element backing plate, and a pair of corresponding projection receiving portions which extend into the other of the first reflective element backing plate or the second reflective element backing plate.

The attachment mechanism may further include a holding projection which extends in another direction than the one or more finger shaped projections.

The one or more finger shaped projections may extend in a direction which is substantially parallel to a plane on which the first reflective element extends.

Each of the finger shaped projections may include a plurality of projecting steps providing a ladder-like configuration and a dovetail guide at an end of each of the finger shaped projections. These projections may extend from an edge of the second reflective element. The projecting steps may act in conjunction with at least one projecting alignment feature which also projects from the edge of the second reflective element At least one of the first reflective element backing plate and the second reflective element backing plate may include a polymeric substrate, and at least one of the first reflective element may include a chromium-based reflective coating applied to a surface of the first reflective element and the second reflective element may include a chromium-based reflective coating applied to a surface of the second reflective element and the second reflective element may include a chromium based reflective coating applied to a polymeric resin wherein the second reflective element and the second reflective element backing plate are one piece.

A surface of the first reflective element backing plate or the second reflective element backing plate may be at least one of flat, curved and convex shaped.

The surface of the first reflective element backing plate and the second reflective element backing plate may be shaped differently.

Each of the first reflective element and the second reflective element may include at least one of a coating, a chromium-based reflective coating, a reflective surface, a display, a screen, an LED screen, and an LCD screen.

The second reflective element may be a spotter mirror providing a wider field of view than the first reflective element.

The second reflective element may be tilted with respect to at least one axis, and a tilting angle is between −30° to 45°.

A surface of the first reflective element may have a minimum radius of curvature of 600 mm.

A surface of the second reflective element may have a radius of curvature between 200-500 mm.

The secondary reflective element backing plate and the primary reflective element backing plate move together in unison with an actuator such that movement of the actuator simultaneously and similarly moves the primary reflective element and the secondary reflective element.

In another aspect, a method of assembling the rearview device may include attaching the second reflective element backing plate to the first reflective element backing plate, placing an adhesive pad, or adhesive tesa or adhesive heater film onto the first reflective element backing plate and the second reflective backing plate, placing the second reflective element on the second reflective element backing plate, placing the first reflective element on the first reflective element backing plate, and pressing together all elements of the rearview device.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Further features, details and advantages of the invention are explained in the appended claims, in the drawings and in the description of a preferred embodiment of the head section according to the invention given below.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any biological and non-biological life form, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
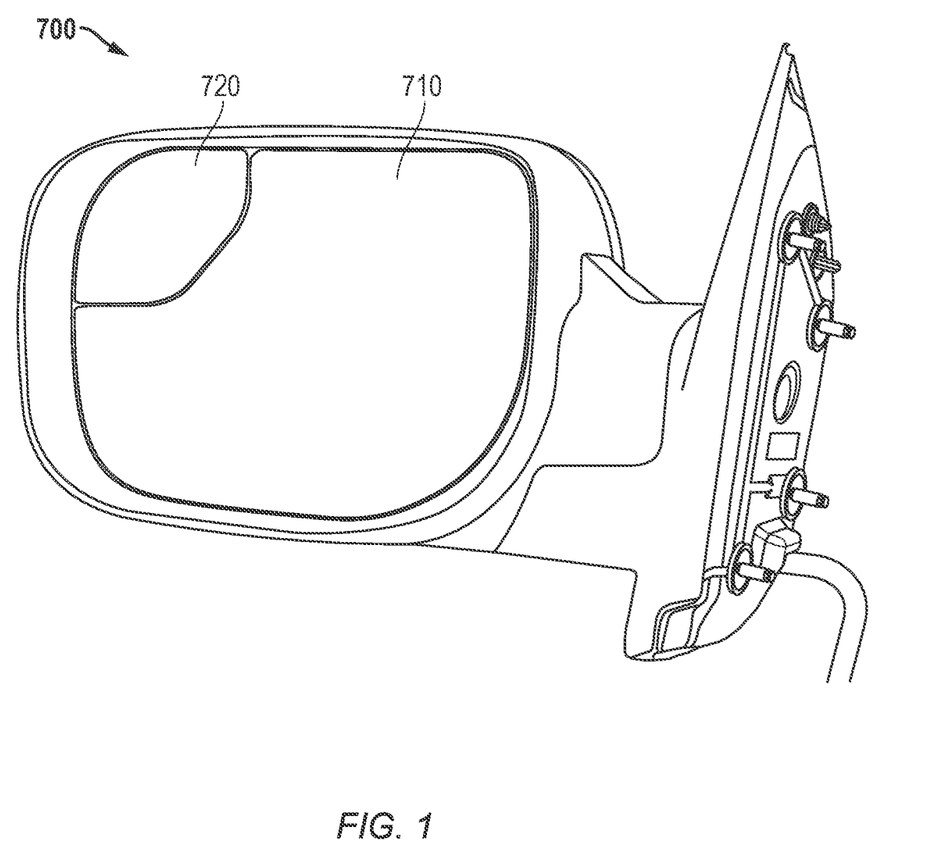
FIG. 1 is a diagram illustrating an example of a rearview device including a primary reflective element and a secondary, blind spot reflective element.

FIG. 1 is a diagram illustrating an example of a rearview device 700 including a primary reflective element 710 and a secondary, blind spot reflective element 720.

Referring to FIG. 1, the rearview device 700 includes a primary reflective element 710 and a secondary, blind spot reflective element 720. The secondary reflective element 720 is a so called spotter having a wider field of view than the first reflective element 710. The first reflective element 710 can include a reflective element in the form of a mirror glass coated with a chrome or silver layer. However, any other known rear view means can be used instead, such as a display. The second reflective element 720 may be provided by a coating on a chromium base applied directly on the backing plate.

In an example, the chromium-based reflective coating is applied to provide the first or second reflective elements. Further details on the coating is described in U.S. patent application Ser. No. 15/439,188, which is herein incorporated by reference in its entirety for all purposes. In the preferred embodiment, the primary reflective element 710 and the secondary reflective element 720 are provided on two separate backing plates which are attached to one another in one or more different ways and using one or more different attachment mechanisms.

Figure 2:
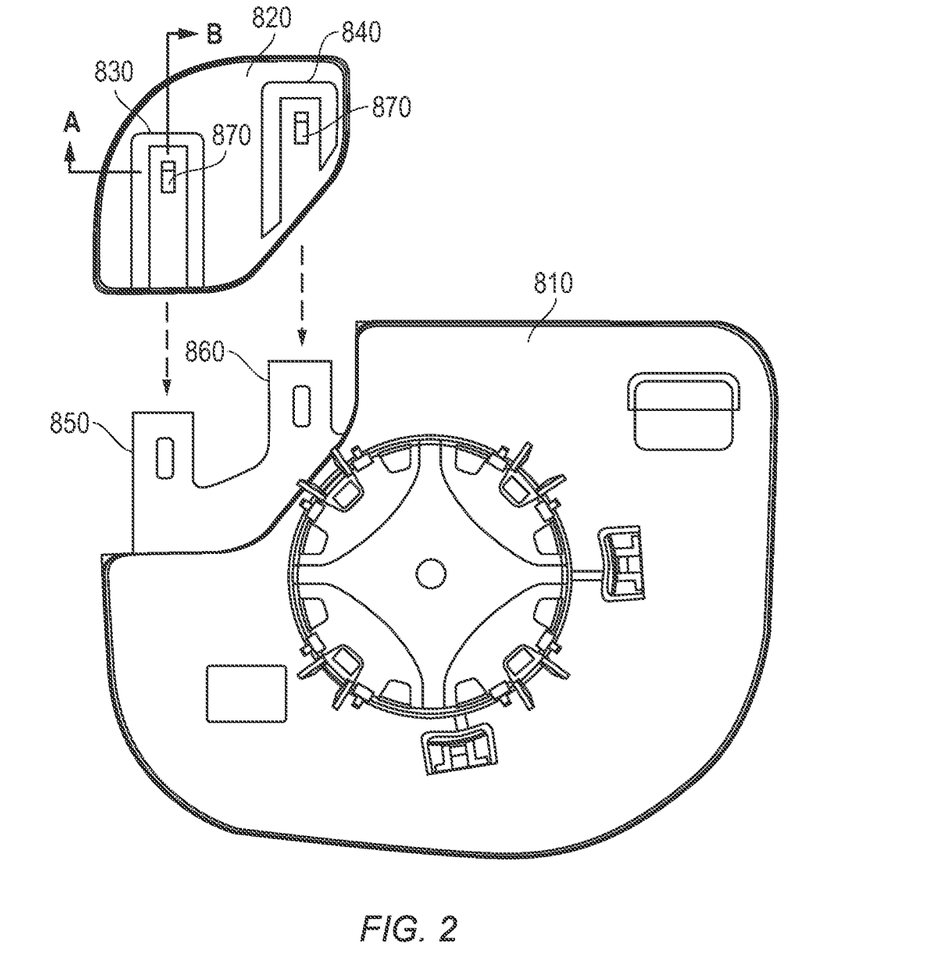
FIG. 2 is a diagram illustrating an example of an attachment between a primary reflective element and a secondary, blind spot reflective element.

FIG. 2 is a diagram illustrating an example of an attachment between a primary reflective element backing plate 810 and a secondary, blind spot reflective element backing plate 820.

Referring to FIG. 2, in a preferred embodiment, an attachment mechanism includes a pair of tracks 850, 860 which project from the primary reflective element backing plate 810 vertically and approximately parallel to the primary reflective element 810. The blind spot backing plate 820 slides in the pair of tracks 850, 860 and includes a pair of track receiving portions 830, 840. Included in the track system 830-860 is a snapping or locking device 870 that holds the blind spot backing plate 820 fixedly secured to the primary reflective element backing plate 810. While this example describes a pair of tracks receiving portions 830, 840 each having a single locking device 870, any number of tracks 850, 860, or track receiving portion 830, 840 with any number of locking devices 870 is envisioned by this invention.

Figure 3:
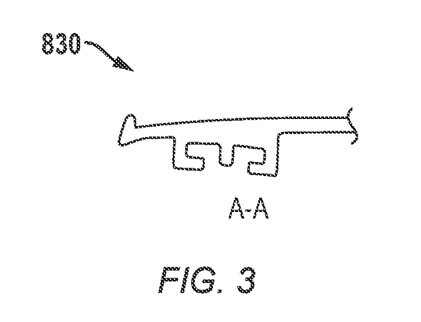
FIG. 3 is a diagram illustrating a cross section along Section A-A of FIG. 2.

FIG. 3 is a diagram illustrating a cross section along Section A-A of FIG. 2. Referring to FIG. 3, a view of the track receiving portion 830 along section A-A is shown. The track receiving portion 830 may include a pair of separate track receiving portions and a shape which corresponds with an opposite or counterpart shape of the track 850.

Figure 4:
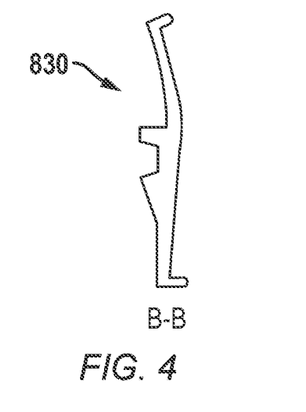
FIG. 4 is a diagram illustrating a cross section along Section B-B of FIG. 2.

FIG. 4 is a diagram illustrating a cross section along Section B-B of FIG. 2. Referring to FIG. 4, a view of the track receiving portion 830 along section B-B is shown. The track receiving portion 830 may include a shape which corresponds with an opposite or counterpart shape of the track 850.

Figure 5:
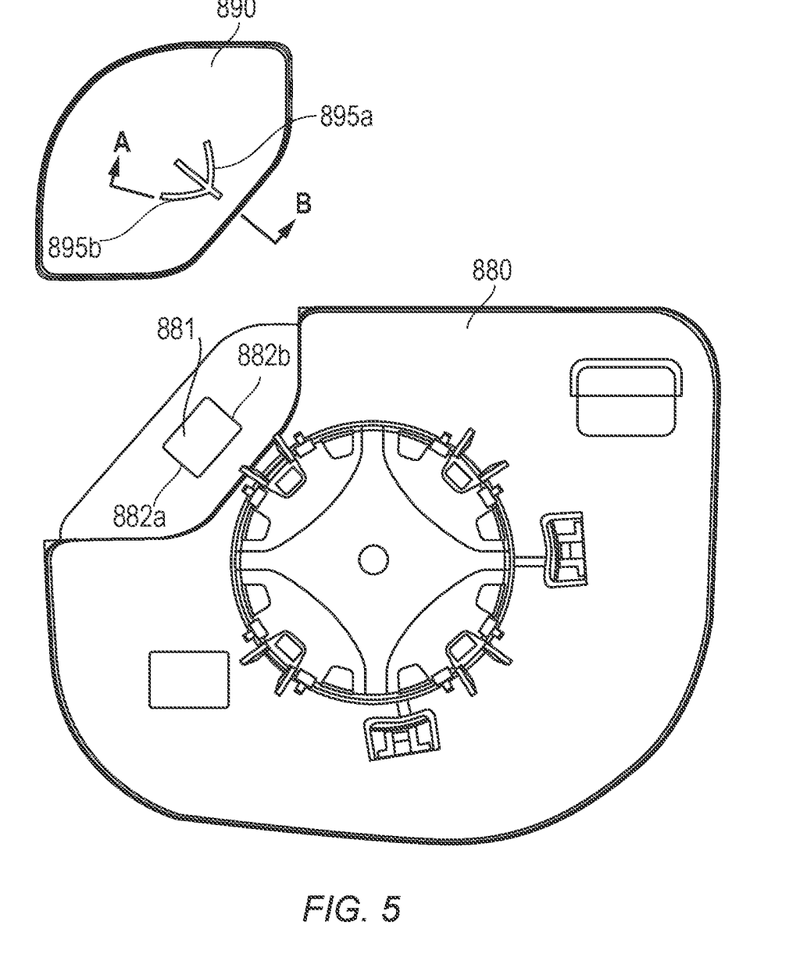
FIG. 5 is a diagram illustrating another example of an attachment between a primary reflective element and a secondary, blind spot reflective element.

FIG. 5 is a diagram illustrating another example of an attachment between a primary reflective element backing plate 880 and a secondary, blind spot reflective element backing plate 890.

Figure 6:
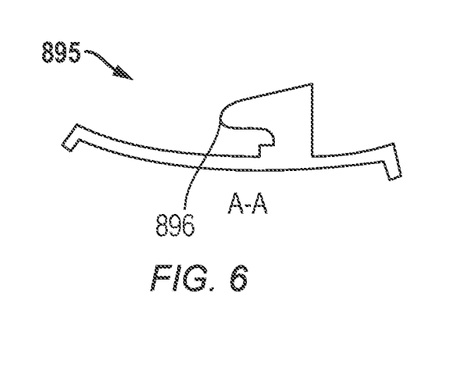
FIG. 6 is a diagram illustrating a cross section along Section A-A of FIG. 5.
Figure 7:
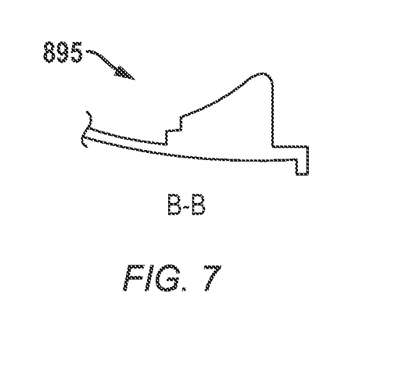
FIG. 7 is a diagram illustrating a cross section along Section B-B of FIG. 5.

Referring to FIG. 5, an attachment mechanism includes snaps 895a and 895b which project from the secondary reflective element backing plate 890. These snaps are received into a hole 881 of the primary reflective element backing plate 880. During installation, the secondary reflective element backing plate moves along an axis perpendicular to the plane of the main primary reflective element. Snaps 895a and 895b may flex towards each other to fit through the hole 881. After the snaps 895a and 895b are sufficiently through hole 881 they may return toward their design position at which point the underneath portion 896 of snap 895a and 895b contacts the sides 882a and 882b of hole 881 thereby holding the secondary reflective element backing plate 890 fixedly secured to the primary reflective element backing plate 880. Referring to FIG. 6, a cross section along Section A-A illustrates the snaps 895 with the underneath portion 896, and referring to FIG. 7, a cross-section along Section B-B illustrates the snaps 895 along another cross-sectional cut. Any number of snaps 895 for locking the secondary reflective element backing plate 890 onto the primary reflective element backing plate 880 is envisioned by this invention.

Figure 8:
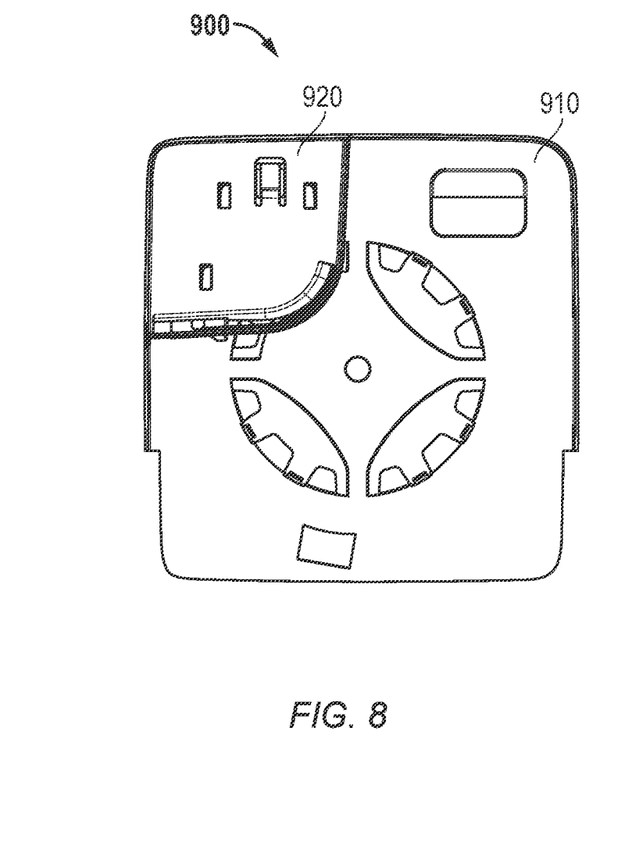
FIGS. 8, 9, and 10 are diagrams illustrating yet another example of an attachment between a primary reflective element and a secondary, blind spot reflective element.
Figure 9:
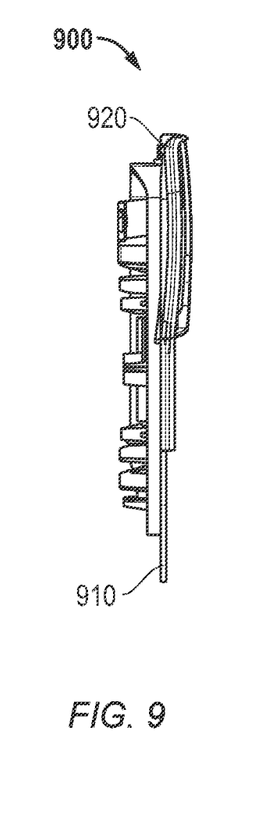
Figure 10:
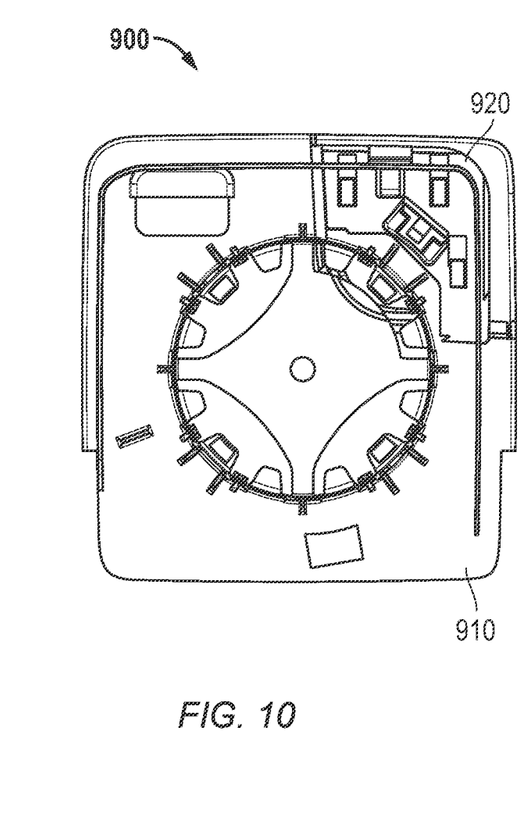

FIGS. 8, 9, and 10 are diagrams illustrating yet another example of an attachment between a primary reflective element backing plate 910 and a secondary, blind spot reflective element backing plate 920.

Referring to FIGS. 8-10, a backing plate assembly 900 includes a primary reflective element backing plate 910 and a secondary, reflective element spotter backing plate 920. FIG. 8 is a rear view of the backing plate assembly 900 with the secondary reflective element backing plate 920 attached to the primary reflective element backing plate 910. FIG. 9 is a side view of the backing plate assembly 900 with the secondary reflective element backing plate 920 attached to the primary reflective element backing plate 910. FIG. 10 is a front view of the backing plate assembly 900 with the secondary reflective element backing plate 920 attached to the primary reflective element backing plate 910. A description of the attachment mechanism is provided in more detail below in connection with FIGS. 11-16.

Figure 11:
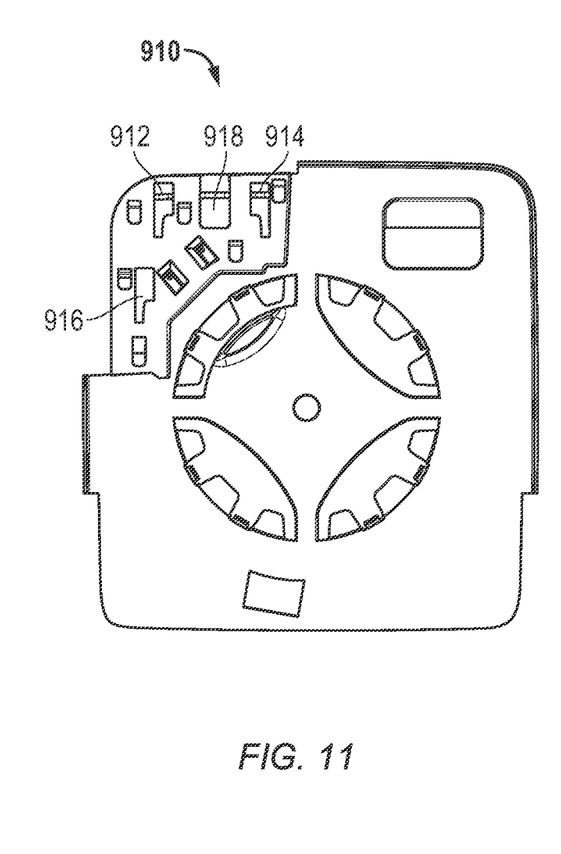
FIGS. 11, 12, and 13 are diagrams illustrating the primary reflective element of FIGS. 8-10 with the secondary reflective element removed.
Figure 12:
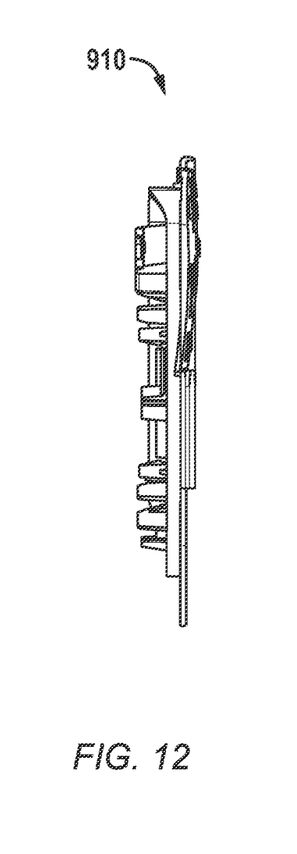
Figure 13:
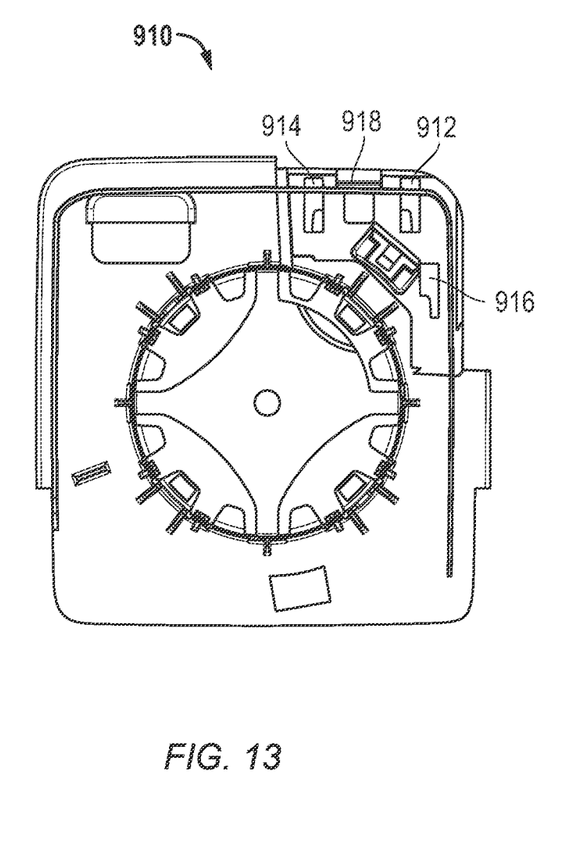

FIGS. 11, 12, and 13 are diagrams illustrating the primary reflective element backing plate 910 of FIGS. 8-10 with the secondary reflective element backing plate 920 removed. FIG. 11 is a rear view of the primary reflective element backing plate 910. FIG. 12 is a side view of the primary reflective element backing plate 910. FIG. 13 is a front view of the primary reflective element backing plate 910. The primary reflective element backing plate 910 includes a number of holes or clip receiving openings 912, 914, 916, 918.

Figure 14:
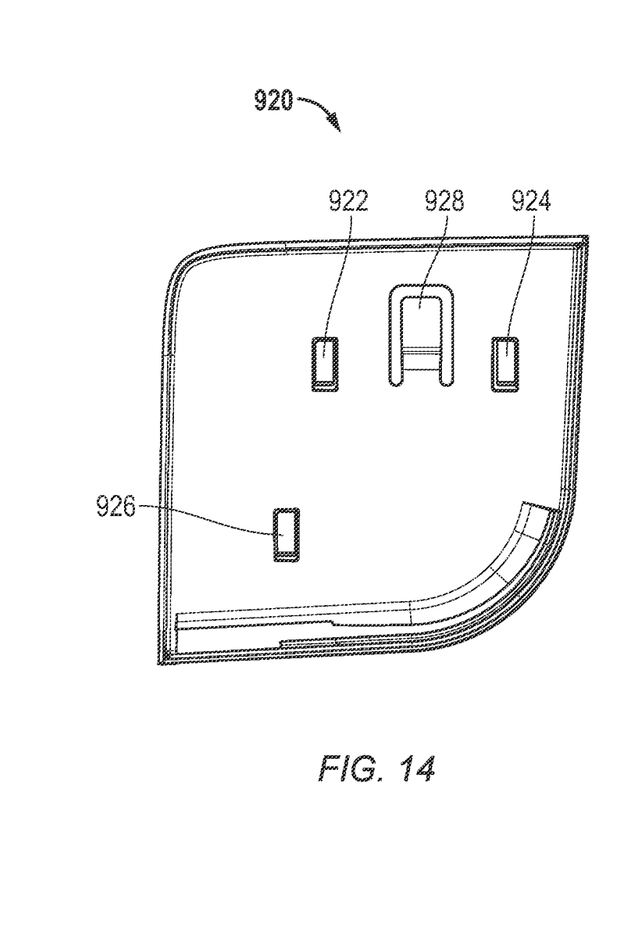
FIGS. 14, 15, and 16 are diagrams illustrating the secondary reflective element of FIGS. 8-10.
Figure 15:
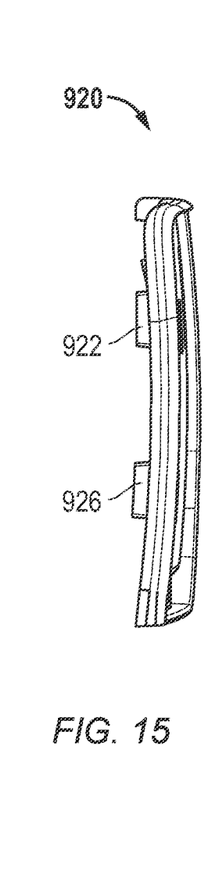
Figure 16:
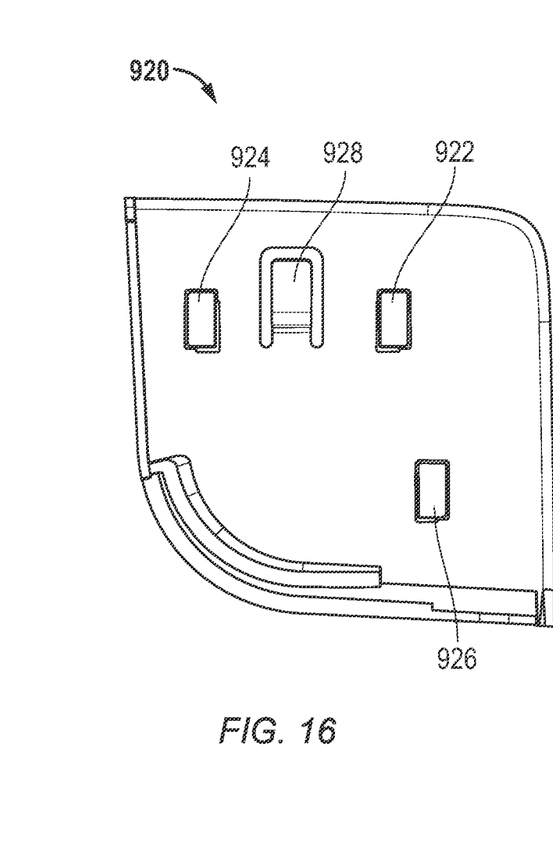

FIGS. 14, 15, and 16 are diagrams illustrating the secondary reflective element backing plate 920 of FIGS. 8-10. FIG. 14 is a rear view of the secondary reflective element backing plate 920. FIG. 15 is a side view of the secondary reflective element backing plate 920. FIG. 16 is a front view of the secondary reflective element backing plate 920. The secondary reflective element backing plate 920 includes a number of alignment hooks 922, 924, 926 which correspond to receiving openings/alignment holes 912, 914, 916 on the primary reflective element backing plate 910. The secondary reflective element backing plate 920 also includes a snap finger 928 which corresponds to the snap receiving slot 918 on the primary reflective element backing plate 910. During installation the secondary reflective element backing plate is inserted into the primary reflective element backing plate in an upper position, then slid downward so that hooks 922, 924, 926 engage with alignment holes 912, 914, 916. During this action snap finger 928 also engages with snap receiving slot 918 to hold the secondary reflective element backing plate 920 fixedly secured to the primary reflective element backing plate 910.

Figure 17:
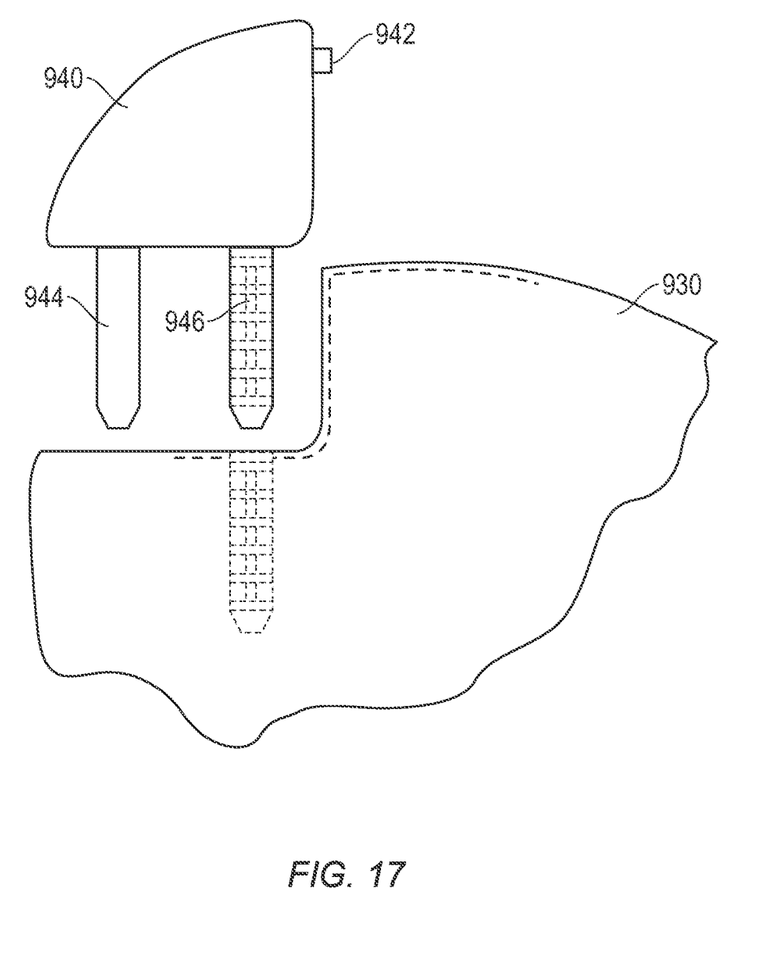
FIG. 17 is a diagram illustrating a further example of an attachment between a primary reflective element and a secondary reflective element.

FIG. 17 is a diagram illustrating a further example of an attachment between a primary reflective element 930 and a secondary reflective element 940. In this example, the secondary reflective element 940 may be either (1) a glass or reflective element and a backing plate or (2) a uniform singular plastic part with a reflective coating such as a chromium based coating applied to it as described throughout this application. The secondary reflective element 940 may include an alignment feature 942 and a pair of fingers 944, 946 which extend downwardly from the second reflective element 940. These features of the holding element 942 and the fingers 944, 946 provide an advantage in that no attachment features need to be included on the surface of the coated area. This, in turn, avoids distortions in the uniform singular plastic part reflective element. In addition, these features provide a spotter element which may be flat and/or can be tilted in several directions such as up, down, forward, and backward with respect to the priority reflective element 930 to achieve specific tilt angles and overlapping fields of view as described throughout this application.

In this example, the fingers 944, 946 of the secondary reflective element 940 are locked into the backing plate of the primary reflective element 930 and may get glued together. The elements of the fingers 944, 946 may be arranged like a ladder and with a dovetail guide, as shown in the figure. The fingers 944, 946 may each also be a singular barb which is received by a mating snap which is commonly known to those skilled in the art. In addition, other designs are possible like other shapes to interpose the primary reflective element 930 and the secondary reflective element 940. For example, a box shape on the backing plate of the primary reflective element 930 may be provided and a counterpart shape on the secondary reflective element 940 may be provided.

In an example, the rear view device of FIG. 17 may be assembled as follows: (1) place backing plate of primary reflective element 930; (2) attached the secondary reflective element 940 to the primary reflective element 930; (3) place the foam adhesive pad, adhesive tesa tape or adhesive heater film to the primary reflective element backing plate 930; (4) place the primary reflective element; and (5) press all the elements together. The other rear view devices described in other embodiments may also be assembled in a similar fashion.

In the above examples, the reflective elements may be secured to each of the backing plates with an adhesive pad. They may also be adhered to the backing plates with a heating element that has adhesive on both sides. The adhesive pads and/or heating element pads used to secure the reflective elements to the resin polymeric resin backing plates may be independent and two piece, or a single piece pad or heating element may be used similar to that which is disclosed in U.S. Pat. No. 8,047,665, which is herein incorporated by reference for all purposes.

In all examples, the blind spot reflective element is shown in the upper outboard corner of the mirror housing. However, this invention includes embodiments where the blind spot reflective element is on the outboard portion of the housing or the lower portion of the housing, among other positions.

Further to the above described examples, preferred dimensions for the radius of curvature may vary between the curved mirror or rear view means and a substantially flat mirror or rear view means. For example, to achieve a wider field of view, the curved mirror may have a radius of curvature that is between 150 mm and 2000 mm. The flat mirror may be entirely flat or may be slightly curved having a significantly larger radius of curvature. In addition, a flat mirror includes a mirror which provides a user with a one to one ratio of magnification. That is, the viewed image may be the same dimensions as the actual image with a 2% plus or minus degree of distortion.

In addition, as described in multiple embodiments above, the secondary reflective element may be tilted with respect to the primary reflective element or flat mirror. Also, both reflective elements may be selectively adjustable by an actuator or manually by a user, being both adjustable together and separately with respect to one another. The preferred positions for the angle of the one mirror, for example the curved mirror, with respect to the other mirror, for example the flat mirror, is between +40 degrees and −40 degrees outwardly, inwardly, upwardly, or downwardly. As used herein, the terms outwardly refers to tilting the mirror away from the door of the vehicle, inwardly refers to tilting the mirror toward the door of the vehicle, upwardly refers to tilting the mirror toward the sky, and downwardly refers to tilting the mirror toward the surface of the road.

The rearview device can also be equipped with different illumination devices.

Different functions and devices can be incorporated into and/or controlled with the help of rearview devices including especially also cameras.

Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809, 509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM_ and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application Ser. No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application Ser. No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 700 rearview device
710 primary reflective element
720 secondary reflective element
810 primary reflective element backing plate
820 secondary reflective element backing plate
830 track receiving portion
840 track receiving portion
850 track
860 track
870 locking device
880 primary reflective element backing plate
881 hole
882a side of hole
882b side of hole
890 secondary reflective element backing plate
895a snap
895b snap
896 underneath portion of snap
900 backing plate assembly
910 primary reflective element backing plate
920 secondary reflective element backing plate
912 receiving opening/alignment hole
914 receiving opening/alignment hole
916 receiving opening/alignment hole
918 snap receiving slot
922 alignment hook
924 alignment hook 926 alignment hook
928 action snap finger
930 primary reflective element
940 secondary reflective element
942 holding element
944 finger
946 finger

What is claimed is:

1. A rearview device for use with a vehicle, comprising:
a first reflective element backing plate;
a first reflective element positioned on the first reflective element backing plate;
a second reflective element backing plate;
a second reflective element positioned on the second reflective element backing plate; and
an attachment mechanism comprising at least one of one or more tracks, snaps, clips, and projections configured to attach the first reflective element backing plate to the second reflective element backing plate,
wherein the attachment mechanism comprises a pair of tracks which extend from either the first reflective element backing plate or the second reflective element backing plate, and a pair of corresponding track receiving portions which extend into the other of the first reflective element backing plate or the second reflective element backing plate.

2. The rearview device of claim 1, wherein each of the pair of track receiving portions comprises at least one lock configured to lock the track into the track receiving portion.

3. The rearview device of claim 1, wherein each of the pair of track receiving portions comprises one or more protrusions configured to interact with one or more protrusion receiving portions on each of the pair of tracks.

4. The rearview device of claim 1, wherein the pair of tracks extend in a direction which is substantially parallel with a plane on which the first reflective element extends.

5. The rearview device of claim 1, wherein at least one of the first reflective element backing plate and the second reflective element backing plate comprises a polymeric substrate, and
at least one of the first reflective element comprises a chromium-based reflective coating applied to a surface of the first reflective element backing plate and the second reflective element comprises a chromium-based reflective coating applied to a surface of the second reflective element backing plate.

6. The rearview device of claim 1, wherein a surface of the first reflective element backing plate or the second reflective element backing plate is at least one of flat, curved and convex shaped.

7. The rearview device of claim 6, wherein the surface of the first reflective element backing plate and the second reflective element backing plate are shaped differently.

8. The rearview device of claim 1, wherein each of the first reflective element and the second reflective element comprise at least one of a coating, a chromium-based reflective coating, a reflective surface, a display, a screen, an LED screen, and an LCD screen.

9. The rearview device of claim 1, wherein the second reflective element is a spotter mirror providing a wider field of view than the first reflective element.

10. The rearview device of claim 1, wherein the second reflective element is tilted with respect to at least one axis, and a tilting angle is between −30° to 45°.

11. The rearview device of claim 1, wherein a surface of the first reflective element has a minimum radius of curvature of 600 mm.

12. The rearview device of claim 1, wherein a surface of the second reflective element has a radius of curvature between 200-500 mm.

13. The rearview device of claim 1, wherein the second reflective element backing plate and the first reflective element backing plate move together in unison with an actuator such that movement of the actuator simultaneously and similarly moves the first reflective element and the second reflective element.

14. A method of assembling the rearview device of claim 1, comprising:
attaching the first reflective element backing plate to the second reflective element backing plate;
placing an adhesive pad or adhesive heating element onto the first reflective element backing plate and the second reflective element backing plate;
placing the second reflective element on the second reflective element backing plate;
placing the first reflective element on the first reflective element backing plate; and
pressing together all elements of the rearview device.

15. A rearview device for use with a vehicle, comprising:
a first reflective element backing plate;
a first reflective element positioned on the first reflective element backing plate;
a second reflective element backing plate;
a second reflective element positioned on the second reflective element backing plate; and
an attachment mechanism comprising at least one of one or more tracks, snaps, clips, and projections configured to attach the first reflective element backing plate to the second reflective element backing plate,
wherein the attachment mechanism comprises one or more finger shaped projections which extend from either the first reflective element backing plate or the second reflective element backing plate, and a pair of corresponding projection receiving portions which extend into the other of the first reflective element backing plate or the second reflective element backing plate, and
wherein the attachment mechanism further comprises a holding projection which extends in another direction than the one or more finger shaped projections.

* * * * *